(No Model.)
D. J. WILLIAMS.
HARROW AND CULTIVATOR.
No. 358,096. Patented Feb. 22, 1887.
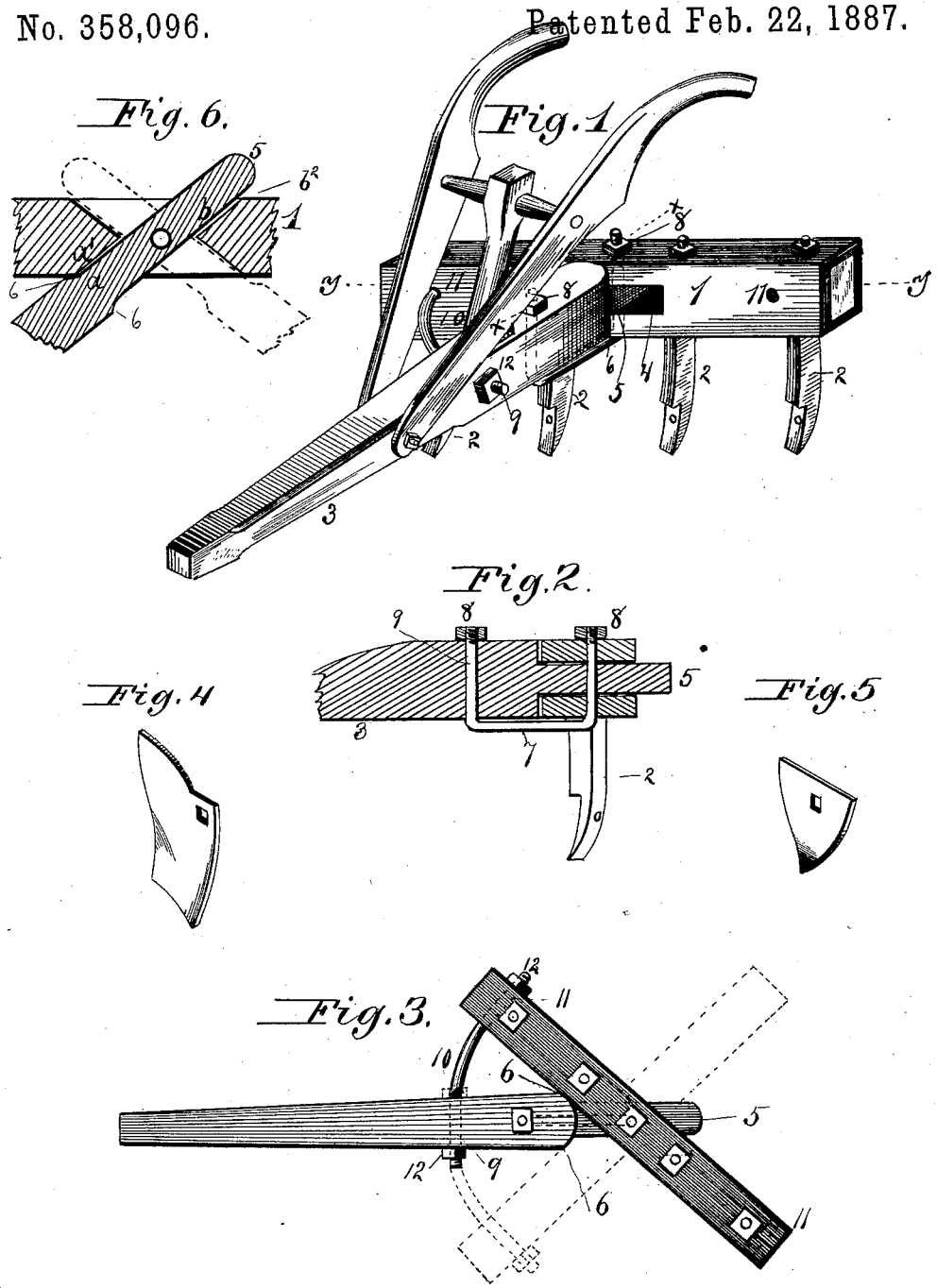

UNITED STATES PATENT OFFICE.

DANIEL J. WILLIAMS, OF HAMPTON, ARKANSAS.

HARROW AND CULTIVATOR.

SPECIFICATION forming part of Letters Patent No. 358,096, dated February 22, 1887.

Application filed October 15, 1886. Serial No. 216,311. (No model.)

*To all whom it may concern:*

Be it known that I, DANIEL J. WILLIAMS, a citizen of the United States, residing at Hampton, in the county of Calhoun and State of Arkansas, have invented certain new and useful Improvements in Harrows and Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a reversible side harrow and cultivator; and it consists in the novel construction and combination of its parts, as hereinafter fully set out in this specification and claims hereto attached.

Referring to the accompanying drawings, Figure 1 is a perspective view of my invention. Fig. 2 is a sectional view of part of same cut on the line $x\ x$. Fig. 3 is a top plan view of the same, and Figs. 4 and 5 are perspective views of points to be used with the same; and Fig. 6 is a sectional view of part of Fig. 1, cut on the line $y\ y$, showing the shape of the mortise-hole 4 and tenon 5.

My invention is described, as follows: I make a cross-beam, 1, of proper length and size, through which are made four or more square or diamond-shaped openings. These openings are perpendicular and receive the necks of the plow-standards 2. These standards have the usual shoulder and tap to secure them in the said cross-beam. The necks of these standards 2 are made square or diamond-shaped to fit the openings in the said cross-beam. To the feet of these standards are secured plow-points or colters of such size and shape as may adapt the harrow and cultivator to the various kinds of work it is to do. When the ends of the said cross-beam are reversed, the said standards are also reversed to front to the forward end of the draft-beam 3. In the center of said cross-beam is made a long mortise-hole, 4, running from the front to the rear face of said beam. Either end of this mortise 4 is made V-shaped, as shown in Fig. 6, for the purpose hereinafter set forth.

A draft-beam, 3, is provided having a tenon, 5, to fit in the mortise-hole 4 in the cross-beam, and has rounded shoulders 6, so that it may be turned either to the right or left. The said draft-beam 3 is pivoted in said mortise 4 by means of a U-shaped bolting-pin, 7, one end of which passes through the cross-beam 1 and through the tenon 5 of the beam 3, and the other end through the said beam 3, a little distance in advance of the shoulders 6. Both ends of the said U-shaped bolting-pin 7 are secured in place by threaded nuts 8. The said draft-beam has made through it horizontally a hole, 9, to receive one end of the curved grass-rod 10, and the cross-beam has made through it horizontally two holes 11, to receive the other end of the said grass-rod.

When I wish to throw the dirt to the right, I couple the right-hand end of the cross-beam close up to the draft-beam, leaving an angle between the two of only about forty-five degrees, by means of the said curved grass-rod 10 and its nuts 12. When I wish to throw the dirt to the left, I couple the left-hand end of said cross-beam close up to the said draft-beam, leaving an angle between the two of only about forty-five degrees, by means of said curved grass-rod and its nuts. The V-shaped ends of the mortise 4 in said cross-beam are so cut, in relation to the width of the tenon 5 and the length of the said curved grass-rod 10, that when the right-hand end of said cross-beam is coupled up to said draft-beam, as above described, its left-hand edge $a$ bears against the front left-hand edge $a'$ of the left-hand end of said mortise and the right-hand edge $b$ of said tenon bears against the rear edge of the right-hand end $b^2$ of said mortise, which arrangement, in connection with said curved grass-rod 10 and nuts 11, holds the parts firmly and rigidly in position. When the cross-beam is reversed, the reversed edges of said tenon and ends of said mortise bind, giving the same result.

Having thus described my invention, what I claim as new, and desire to secure by Letters Patent, is—

The combination of the cross-beam having the plow-standards and mortise, said mortise having the V-shaped ends, as shown, the draft-beam having its tenon pivoted in said mortise, the U-shaped bolt, one end passing perpendicularly through said cross-beam, mortise, and tenon, and the other through said draft-beam, and the curved grass rod passing horizontally through said cross and draft beams, holding said beams at an angle, as described, and impinging the shoulders against the front edge of said cross-beam and the edges of said tenon against the front and rear edges of said mortise, substantially as shown and described.

In testimony whereof I affix my signature in presence of two witnesses.

DANIEL J. WILLIAMS.

Witnesses:
W. S. EVINS,
J. H. PARKER.